Nov. 20, 1928.

K. THIELICKE

AUTOMATIC EGG BOILER

Filed July 18, 1927

1,692,144

Patented Nov. 20, 1928.

1,692,144

UNITED STATES PATENT OFFICE.

KARL THIELICKE, OF WETTIN, GERMANY.

AUTOMATIC EGG BOILER.

Application filed July 18, 1927, Serial No. 206,758, and in Germany September 16, 1926.

This invention relates to an apparatus for boiling eggs. The novelty of the invention consists in that the eggs to be boiled are automatically lifted out of the water after a certain time. This is obtained by making a cylinder, closed at the top end on which the eggs to be boiled are accommodated, rise from the water by the action of the generated steam.

An embodiment of the invention is shown, by way of example, in the accompanying drawings in which:—

Figure 1:
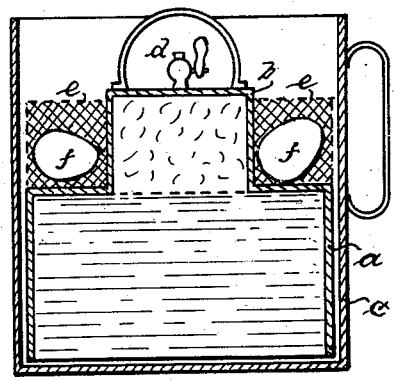
Fig. 1 shows the automatic egg-boiler in cross section.
Figure 2:
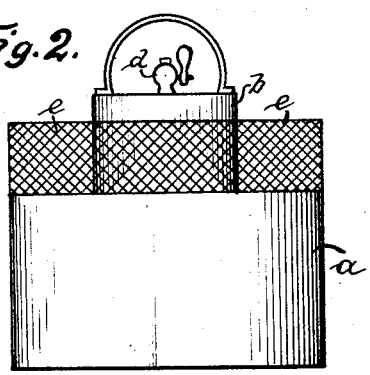
Fig. 2 shows the cylinder in elevation.

The egg-boiler consists of a cylinder $a$ having a steam-dome $b$ and of a pot $c$. The cylinder $a$ which fits into the pot $c$ with little clearance is open at the bottom end. On the steam-dome $f$ an air outlet valve $d$ is arranged, said dome being surrounded by a wire-gauze $e$, designed to accommodate the eggs $f$.

The operation is as follows:—

The eggs $f$ to be boiled are placed around the steam-dome $d$, whereupon the cylinder $a$ is inserted into the pot $c$ which is filled with water to about ¾ of the height. To facilitate descending of cylinder $a$ onto the bottom of the pot the outlet valve $d$ for the air is opened and closed subsequently.

When the water is boiling steam is generated and collects in the dome $b$ so that the cylinder ascends. As the cylinder rises from the water to about half its height, the eggs can be boiled only for a certain time. The duration of the boiling period can be regulated by the water-quantity.

I claim:

An automatic egg-boiler comprising in combination with a pot partly filled with water, a cylinder open at the bottom and closed at the top located in said pot, a steam dome forming part of the top-plate of said cylinder and around which the eggs are placed, and an air-valve on the top of said cylinder.

In testimony whereof I affix my signature.

KARL THIELICKE.